(12) United States Patent
Sugita

(10) Patent No.: US 8,611,220 B2
(45) Date of Patent: Dec. 17, 2013

(54) NETWORK SYSTEM, CONTROLLER, AND NETWORK CONTROL METHOD

(75) Inventor: Takahide Sugita, Tokyo (JP)

(73) Assignee: NEC Corporation, Tokyo (JP)

( * ) Notice: Subject to any disclaimer, the term of this patent is extended or adjusted under 35 U.S.C. 154(b) by 140 days.

(21) Appl. No.: 13/200,756

(22) Filed: Sep. 30, 2011

(65) Prior Publication Data

US 2012/0020220 A1    Jan. 26, 2012

Related U.S. Application Data

(63) Continuation of application No. PCT/JP2010/072581, filed on Dec. 15, 2010.

(30) Foreign Application Priority Data

Jan. 4, 2010    (JP) ................................ 2010-000252

(51) Int. Cl.
*G01R 31/08* (2006.01)

(52) U.S. Cl.
USPC .......................................... 370/235; 370/400

(58) Field of Classification Search
CPC ..... H04L 45/38; H04L 45/00; H04L 12/4641; H04L 41/0893; H04L 43/026
See application file for complete search history.

(56) References Cited

U.S. PATENT DOCUMENTS

| 2006/0225141 A1 | 10/2006 | Fujimori |
| 2007/0177600 A1 | 8/2007 | Suzuki et al. |
| 2009/0138577 A1* | 5/2009 | Casado et al. ................ 709/220 |
| 2010/0257263 A1* | 10/2010 | Casado et al. ................ 709/223 |

FOREIGN PATENT DOCUMENTS

| JP | 09-270813 A | 10/1997 |
| JP | 2006-067078 A | 3/2006 |
| JP | 2006-279691 A | 10/2006 |
| JP | 2007-201966 A | 8/2007 |

OTHER PUBLICATIONS

International Search Report dated Jan. 25, 2011 for PCT/JP2010/072581.

* cited by examiner

*Primary Examiner* — Jung Park
(74) *Attorney, Agent, or Firm* — McGinn IP Law Group, PLLC

(57) ABSTRACT

When an appliance, which has a packet discard function, discards a packet, transmits packet discard information as information related to the discarded packet to a controller. A controller performs a switch control process in response to the packet discard information. In the switch control process, the controller selects a target switch from the network, creates entry setting information for instructing the target switch to create an entry such that a packet belonging to the same flow as the discarded packet is discarded, and transmits the created entry setting information to the target switch. The target switch sets an entry in its own flow table in response to the entry setting information transmitted from the controller.

8 Claims, 14 Drawing Sheets

Fig. 5

CON: CONNECTION INFORMATION

| CONNECTION SOURCE | CONNECTION SOURCE PORT | CONNECTION DESTINATION | CONNECTION DESTINATION PORT |
|---|---|---|---|
| SWITCH 300-1 | #0 | SWITCH 300-4 | #1 |
|  | #1 | APPLIANCE 100-1 | #0 |
|  | #2 | APPLIANCE 100-1 | #1 |
|  | #3 | SWITCH 300-2 | #0 |
| SWITCH 300-2 | #0 | SWITCH 300-1 | #3 |
|  | #1 | SERVER 10-1 | #0 |
|  | #2 | SERVER 10-2 | #0 |
|  | #3 | SERVER 10-3 | #0 |
|  | #4 | SWITCH 300-3 | #1 |
| SWITCH 300-3 | #0 | SWITCH 300-4 | #2 |
|  | #1 | SWITCH 300-2 | #4 |
| SWITCH 300-4 | #0 | EXTERNAL NETWORK | N/A |
|  | #1 | SWITCH 300-1 | #0 |
|  | #2 | SWITCH 300-2 | #0 |

Fig. 10

DRP: Nov 1 12:00:00 fw kernel: DROP :IN=eth1 OUT=eth0 SRC=X.X.X.X DST=Y.Y.Y.Y LEN=28 TOS=0x00 PREC=0x00 TTL=64 ID=1111 PROTO=TCP SPT=1234 DPT=5678 LEN=8

ENT:

| Input switch port | Ethernet src | Ethernet dst | VLAN id | Ethernet type | IP protocol | src IP | dst IP | src port | dst port | action |
|---|---|---|---|---|---|---|---|---|---|---|
| 0 | * | * | * | 0x800 | tcp | X.X.X.X | Y.Y.Y.Y | 1234 | 5678 | drop |

Fig. 11

```
[**] [X:XXXXXXXXX:X] X Web Attack attempt [ ] **
[Classification: Web Application Attack][Priority: 1]
MM/DD-00:00:00 X.X.X.X:8765→ Y.Y.Y.Y:4321
TCP TTL:xxx TOS:0xx ID:xxxxx IpLen:XX DgmLen:XXXX DF
Seq: 0xxxxxxxxx Ack: 0xxxxxxxxx Win: 0xxxx TcpLen: xx
[ref-> http://www.sample.com/sample.cgi?name=xxxx-xxxx]
```
DRP

| Input switch port | Ethernet src | Ethernet dst | VLAN id | Ethernet type | IP protocol | src IP | dst IP | src port | dst port | action |
|---|---|---|---|---|---|---|---|---|---|---|
| 0 | * | * | * | 0x800 | tcp | X.X.X.X | Y.Y.Y.Y | 8765 | 4321 | drop |

ENT

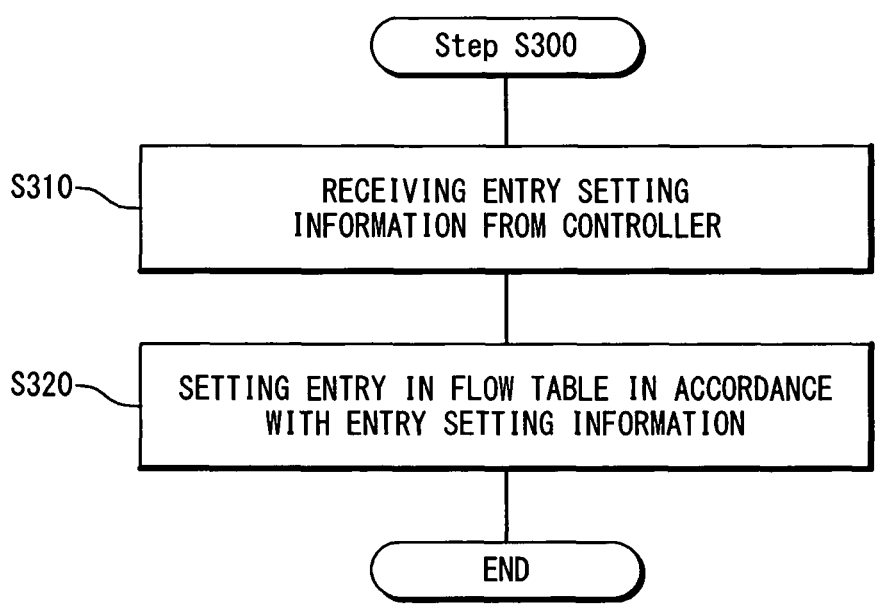

NETWORK SYSTEM, CONTROLLER, AND NETWORK CONTROL METHOD

CROSS-REFERENCE TO RELATED APPLICATION

This is continuation of International Application No. PCT/JP2010/072581 filed on Dec. 15, 2010.

TECHNICAL FIELD

The present invention relates to a network system and its control method, and more specifically relates to a network system including an appliance having a packet discard function and its control method.

BACKGROUND ART

An appliance (network appliance) is a network device that executes a specific process on network traffic. For example, a firewall is an appliance having a function of discarding a specified packet. Specifically, the firewall refers to a preset rule (policy), and if a received packet has matched a condition specified by this rule, discards this received packet. This can prevent unauthorized access to and attack on a server.

Following is known as a technique related to measures against attack on a server on the Internet.

Patent Literatures 1 (Japanese patent publication JP2006-67078A) discloses an IP router. This IP router includes: an attack detection means, a transfer means, and a filter means. The attack detection means detects attack targeted on a server on the Internet. Upon the attack detection, the transfer means transfers attack detection information to a management device that performs monitoring and status recognition of an entire network. The filter means, in accordance with instructions from the management device, identifies and controls an attack flow that matches a specific bit pattern.

Patent Literature 2 (Japanese patent publication JP2007-201966A) discloses a management server. The management server is connected to a plurality of packet relay devices each having a plurality of ports. This management server includes: a topology information storing portion, a flow information receiving portion, and a flow origin searching portion. The topology information storing portion stores information on connection relationship between the plurality of ports in the plurality of packet relay devices. The flow information receiving portion receives from the plurality of packet relay devices flow information identifying a traffic flow and input port information indicating an input port. The flow origin searching portion, based on the input port information, the flow information and the connection relationship information, searches for an origin of the traffic flow.

CITATION LIST

Patent Literature

Patent Literature 1: JP2006-67078A
Patent Literature 2: JP2007-201966A

SUMMARY OF INVENTION

As described above, the appliance having the packet discard function, upon every packet reception, determines whether or not the received packet should be discarded. Then if the determination result is the discard, the appliance discards this received packet. However, continuously supplying the traffic of the packet to be discarded to this appliance leads to waste of appliance resources and a network band width.

An object of the present invention is to prevent waste of appliance resources and a network band width in a network system including an appliance having a packet discard function.

In one aspect of the present invention, a network system is provided. This network system includes: an appliance and a switch arranged in a network; and a controller connected to the appliance and the switch. The switch includes a flow table. Each entry of the flow table indicates a match condition and an action to be performed on a packet which matches the match condition. The switch sets an entry in the flow table in response to entry setting information transmitted from the controller. The switch, upon receiving a reception packet, refers to the flow table and carries out an action specified by an entry which matches the reception packet on the reception packet. The appliance has a packet discard function, and when the packet is discarded, transmits packet discard information as information related to the discarded packet to the controller. The controller performs a switch control process in response to the packet discard information. In the switch control process, the controller selects a target switch from the network, creates entry setting information for instructing the target switch to create an entry such that a packet belonging to the same flow as the discarded packet is discarded, and transmits the created entry setting information to the target switch.

In another aspect of the present invention, a controller connected to an appliance and a switch arranged in a network is provided. The switch includes a flow table. Each entry of the flow table indicates a match condition and an action to be performed on a packet which matches the match condition. The switch sets an entry in the flow table in response to entry setting information transmitted from the controller. The switch, upon receiving a reception packet, refers to the flow table and carries out an action specified by an entry which matches the reception packet on the reception packet. The appliance has a packet discard function, and when the packet is discarded, transmits packet discard information as information related to the discarded packet to the controller. The controller includes: a storage device storing the packet discard information; and a processor performing a switch control process in response to the packet discard information. In the switch control process, the processor selects a target switch from the network, creates entry setting information for instructing the target switch to create an entry such that a packet belonging to the same flow as the discarded packet is discarded, and transmits the created entry setting information to the target switch.

In still another aspect of the present invention, a control method for a network including an appliance and a switch arranged therein is provided. The switch includes a flow table. Each entry of the flow table indicates a match condition and an action to be performed on a packet which matches the matching condition. The switch sets an entry in the flow table in response to entry setting information. The switch, upon receiving a reception packet, refers to the flow table and carries out an action specified by an entry which matches the reception packet on the reception packet. The control method according to the present invention includes: (A) when a packet is discarded in the appliance, obtaining packet discard information as information related to the discarded packet; and (B) performing a switch control process in response to the packet discard information. The switch control process includes: (B1) selecting a target switch from the network; (B2) creating entry setting information for instructing the target switch to create an entry such that a packet belonging to the same flow as the discarded packet is discarded; and (B3) transmitting the created entry setting information to the target switch.

In still another aspect of the present invention, a control program for making a computer execute a control process of a network including an appliance and a switch arranged therein is provided. The switch includes a flow table. Each entry of the flow table indicates a match condition and an action to be performed on a packet which matches the matching condition. The switch sets an entry in the flow table in response to entry setting information. The switch, upon receiving a reception packet, refers to the flow table and carries out an action specified by an entry which matches the reception packet on the reception packet. The control process according to present invention includes: (A) when a packet is discarded in the appliance, obtaining packet discard information as information related to the discarded packet; and (B) performing a switch control process in response to the packet discard information. The switch control process includes: (B1) selecting a target switch from the network; (B2) creating entry setting information for instructing the target switch to create an entry such that a packet belonging to the same flow as the discarded packet is discarded; and (B3) transmitting the created entry setting information to the target switch.

According to the present invention, in the network system including the appliance having the packet discard function, waste of appliance resources and a network band width can be prevented.

BRIEF DESCRIPTION OF DRAWINGS

The above and other objects, advantages and features of the present invention will be more apparent from the following description of certain preferred exemplary embodiments taken in conjunction with the accompanying drawings, in which:

FIG. 5 shows one example of connection information in the present exemplary embodiment;

FIG. 10 shows one example of conversion from packet discard information into entry setting information in the present exemplary embodiment;

FIG. 11 shows another example of the conversion from the packet discard information into the entry setting information in the present exemplary embodiment;

FIG. 12 is a flow chart showing the step S300 in the present exemplary embodiment;

DESCRIPTION OF EXEMPLARY EMBODIMENTS

The exemplary embodiment of the present invention will be described referring to the accompanying drawings.

1. Network System

Figure 1:
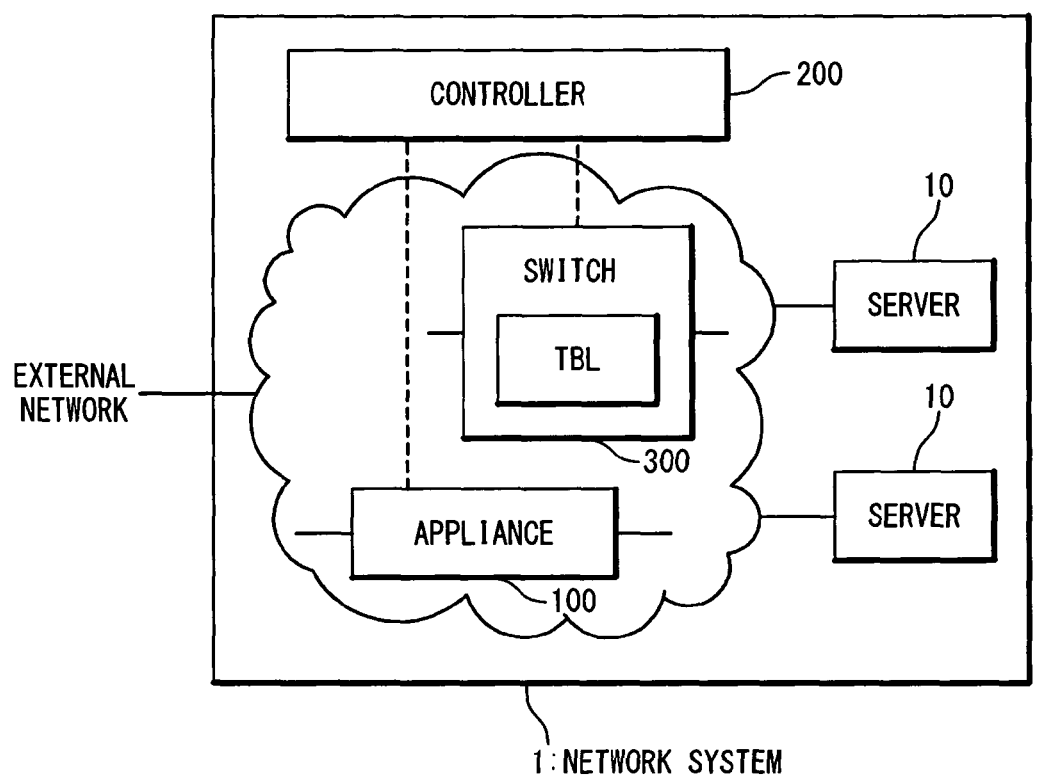
FIG. 1 is a block diagram schematically showing a configuration of a network system according to an exemplary embodiment of the present invention.

FIG. 1 schematically shows a configuration of a network system 1 according to the present exemplary embodiment. The network system 1 according to the present exemplary embodiment is applied to, for example, a data center.

The network system 1 includes: servers 10, appliances 100, and switches 300. The appliances 100 and the switches 300 form an appliance-switch network. The servers 10 are connected to this appliance-switch network. The appliance-switch network is further connected to an external network located outside of the network system 1.

The appliance (network appliance) 100 is a network device that executes a specific process on a network traffic. In the present exemplary embodiment, the appliance 100 has a "packet discard function". Specifically, the appliance 100 refers to a preset rule (policy), and when a reception packet matches a condition specified by this rule, the appliance 100 discards this reception packet. As the appliance 100, a firewall, a WAF (Web Application Firewall), an IPS (Intrusion Prevention System), a mail security device and the like are exemplified.

Figure 2:
FIG. 2 shows one example of a flow table included in a switch according to the present exemplary embodiment.

The switch 300 performs a switch process such as packet transfer. More specifically, the switch 300 includes a flow table TBL as shown in FIG. 2. Each entry of the flow table TBL indicates a "match condition (flow identification information)" and an "action". The "match condition" includes a combination of parameters including a packet input port, a source MAC address, a destination MAC address, a source IP address, a destination IP address, a source port number, a destination port number, etc. A flow is also defined by a combination of those parameters. That is, the "match condition" is also the flow identification information defined by the flow. The "action" indicates a process performed on a packet which matches the match condition. As the "action", packet output to a specified port, packet discard, etc are exemplified.

The switch 300, upon receiving a packet, searches for an entry which matches this reception packet with reference to the flow table TBL. Specifically, the switch 300 extracts header information of the reception packet, and searches the flow table TBL by using the input port and the header information of the reception packet as search keys. The entry indicating the match condition which matches these search keys is a match entry which matches the reception packet. When the reception packet matches the match condition of any entry, that is, when the match entry is found, the switch 300 carries out the "action" specified by this match entry on the reception packet.

The network system 1 further includes a controller 200 controlling traffics in the network. The controller 200 is connected to each appliance 100 and each switch 300 arranged in the network via control lines (indicated by broken lines in FIG. 1). The controller 200 receives information from the appliances 100 and the switches 300 via the control lines and also controls the appliances 100 and the switches 300 via the control lines.

For example, the controller 200 has a function of setting contents of the flow table TBL of each switch 300 via the control line. Specifically, the controller 200 creates "entry setting information" which is instructions for entry setting (addition, change, deletion, etc.), and transmits this entry setting information to a target switch 300. The target switch 300 that receives the entry setting information, in accordance with this entry setting information, performs the entry setting (addition, change, deletion, etc.) in its own flow table TBL. As described above, the controller 200 can control operation of the switch 300 though setting the contents of the flow table TBL and thereby appropriately controlling the network traffics.

As an interface system between the controller 200 and the switch 300 for realizing such process, OpenFlow (see http://www.openflowswitch.org/) is exemplified. In this case, an "OpenFlow Controller" serves as the controller 200, and an "OpenFlow Switch" serves as each switch 300.

2. Controller

Figure 3:
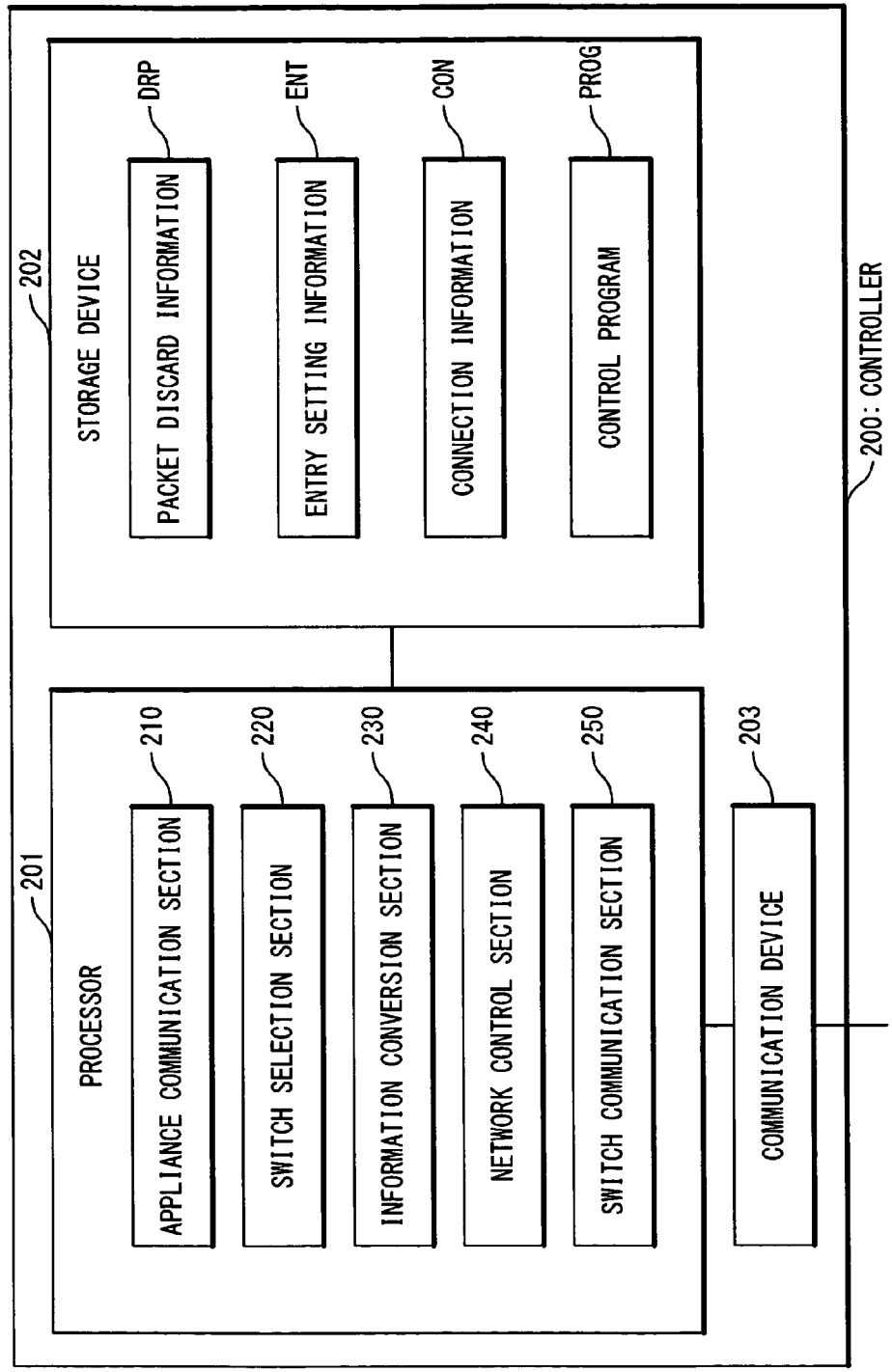
FIG. 3 is a block diagram showing a configuration of a controller according to the present exemplary embodiment.

FIG. 3 is a block diagram showing a configuration of the controller 200 according to the present exemplary embodiment. The controller 200 includes: a processor 201, a storage device 202, and a communication device 203. The processor 201 includes: a CPU (Central Processing Unit). The storage device 202 includes, for example, a RAM (Random Access Memory) and an HDD (Hard Disk Drive). The communication device 203 includes, for example, a network card performing communication with the outside.

The storage device 202 stores packet discard information DRP, entry setting information ENT, connection information CON, etc.

The packet discard information DRP is information related to a packet discarded by the appliance 100 having the packet discard function. Details of this will be described later.

The entry setting information ENT is, as described above, information for instructing the target switch 300 to execute the entry setting (addition, change, deletion, etc.).

Figure 4:
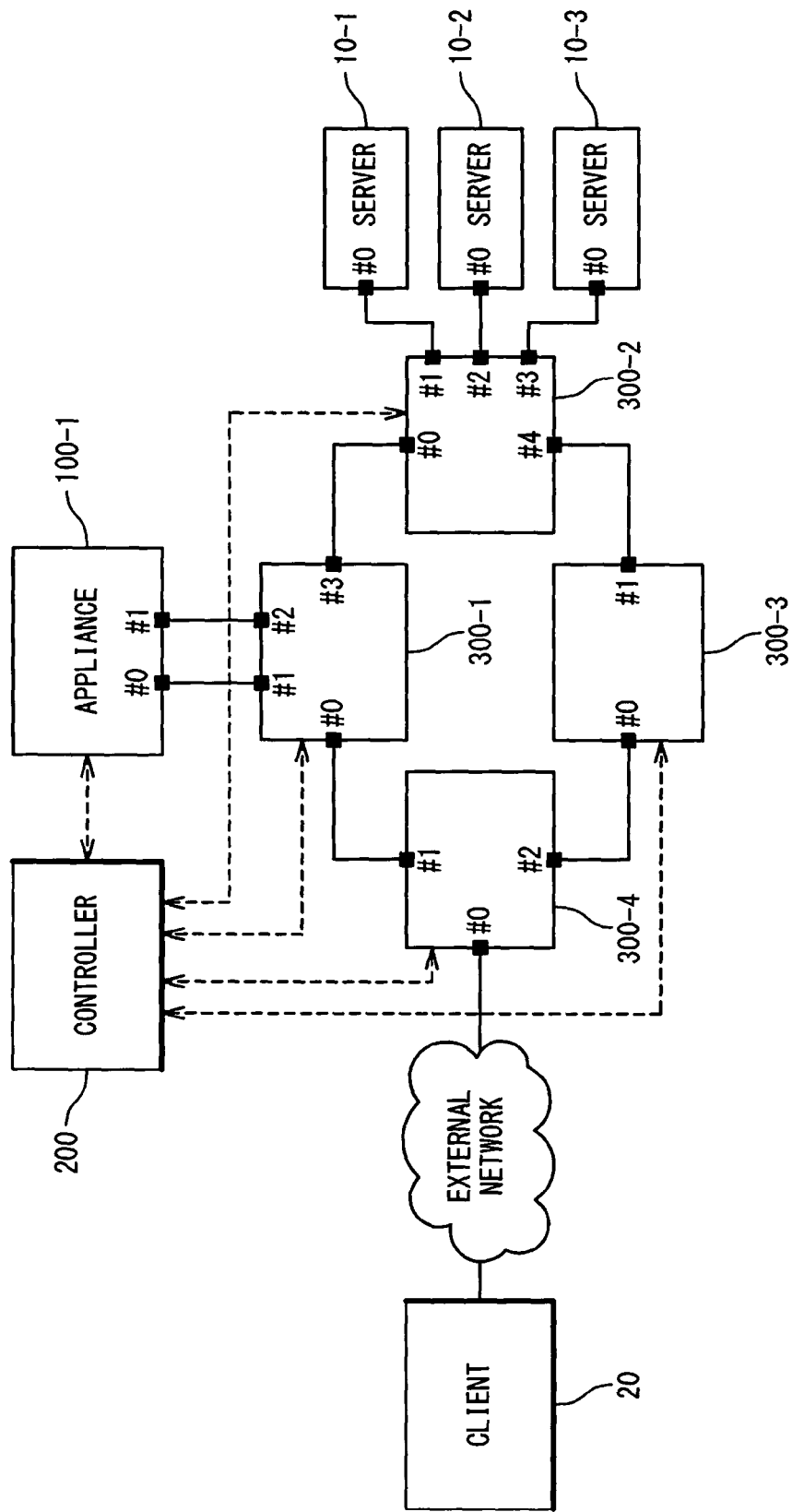
FIG. 4 shows one example of a network connection relationship in the present exemplary embodiment.

The connection information CON indicates connection relationship of the network. That is, the connection information CON indicates connection relationship (topology) between components such as the servers 10, the appliances 100, and the switches 300. FIG. 4 shows one example of the network connection relationship. FIG. 5 shows one example of the connection information CON in a case of FIG. 4. In the example of FIG. 5, the connection information CON indicates: identification information of connection sources, respective ports of the connection sources, and identification information and ports of connection destinations connected to the connection source ports. As the identification information of the connection sources and the connection destinations, MAC addresses and IP addresses are exemplified. Note that the controller 200 can obtain the connection information CON by using, for example, LLDP (Link Layer Discovery Protocol) defined by IEEE802.1AB.

The processor 201 performs a "network control process" according to the present exemplary embodiment. More specifically, as shown in FIG. 3, the processor 201 includes: an appliance communication section 210, a switch selection section 220; an information conversion section 230; a network control section 240; and a switch communication section 250. These function blocks are realized by executing a control program PROG by the processor 201. The control program PROG is a computer program executed by a computer (the processor 201) and stored into the storage device 202. The control program PROG may be stored into a computer-readable recording medium.

3. Process Flow

3-1. Outline

Figure 6:
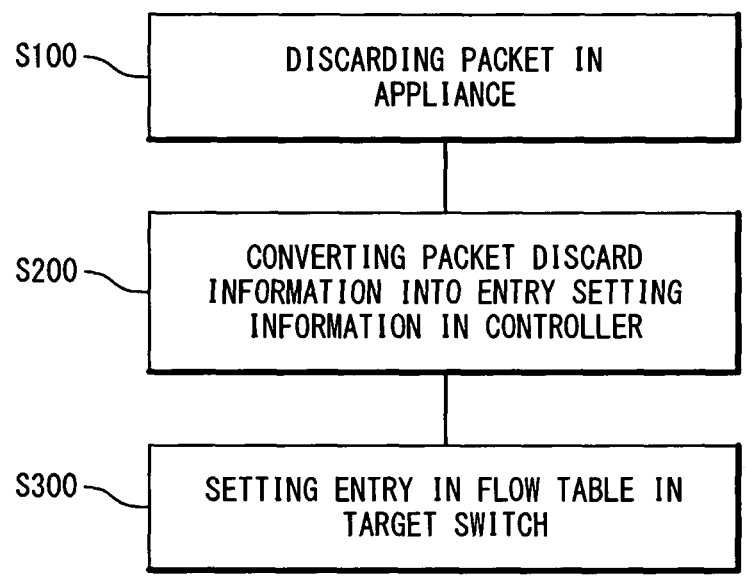
FIG. 6 is a flowchart showing a process according to the present exemplary embodiment.
Figure 7:
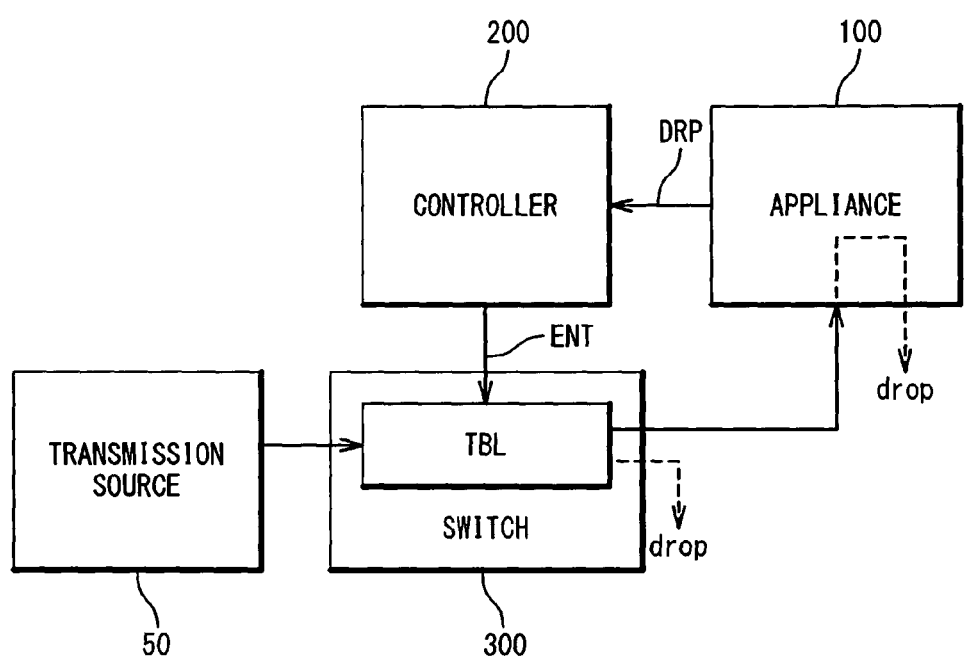
FIG. 7 is a conceptual diagram showing a process according to the exemplary embodiment.

FIGS. 6 and 7 are a flowchart and a conceptual diagram, respectively, showing the process according to the present exemplary embodiment. Referring to FIGS. 6 and 7, the outline of the process according to the present exemplary embodiment will be described.

Step S100:

As shown in FIG. 7, a transmission source 50 transmits a packet. This packet arrives at the appliance 100 through the switch 300. The appliance 100 has the packet discard function, and discards the reception packet in some cases. When the appliance 100 has discarded this packet, the appliance 100 transmits to the controller 200 the packet discard information DRP as information related to this discarded packet.

Step S200:

The controller 200, in response to the packet discard information DRP, performs a "switch control process". Specifically, the controller 200 selects any one of the switches 300 located on a path between the transmission source 50 and the appliance 100 as a "target switch". Moreover, the controller 200 creates the entry setting information ENT for giving instructions for creating an entry such that a packet belonging to the same flow as the discarded packet is discarded. That is, the controller 200 converts the packet discard information DRP into the entry setting information ENT corresponding thereto. Then, the controller 200 transmits this entry setting information ENT to the target switch 300. That is, the controller 200 instructs the target switch 300 to discard the packet belonging to the same flow as the discarded packet.

Step S300:

The target switch 300 which has received the entry setting information ENT sets an entry in its own flow table TBL in accordance with this entry setting information ENT. Specifically, the target switch 300 creates the entry such that the packet belonging to the same flow as the discarded packet in the appliance 100 is discarded. As a result, a subsequent packet belonging to this flow is discarded by the target switch 300.

As described above, according to the present exemplary embodiment, when the appliance 100 has discarded a packet belonging to a given flow, a subsequent packet belonging to the same flow is discarded by the target switch 300 without being transferred to the appliance 100. As a result, traffic of the flow to be discarded is no longer continuously supplied to the appliance 100. Therefore, waste of appliance resources and a network band width is prevented. The appliance resources and the network band width can efficiently be used.

3-2. Detailed Flow

Figure 8:
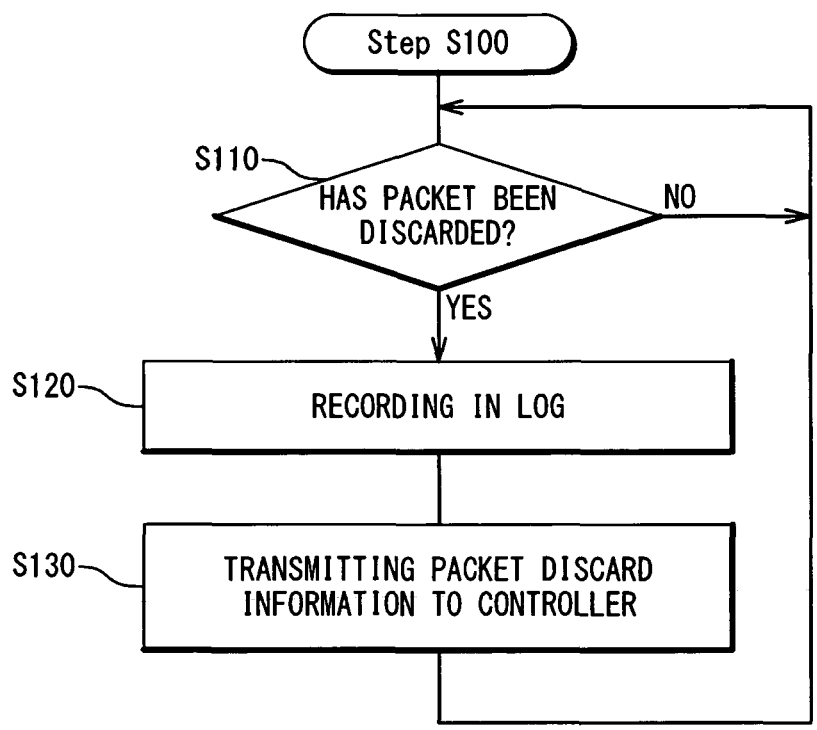
FIG. 8 is a flowchart showing the step S100 in the present exemplary embodiment.

FIG. 8 is a flowchart more specifically showing step S100 performed by the appliance 100.

Step S110:

The appliance 100, upon receiving a packet, refers to the preset rule (policy) and checks whether or not the reception packet matches a condition specified by this rule. If the reception packet matches the condition specified by this rule, this reception packet is discarded.

Step S120:

When the packet has been discarded (Yes in step S110), the appliance 100 records information related to this discarded packet in a log. Note that such log function can be realized by "syslog" typically adopted in many appliances.

Step S130:

Further, the appliance 100 transmits the log information, which is recorded in step S120 described above, as the packet discard information DRP to the controller 200. Note that such transmission function can also be realized by the "syslog".

Figure 9:
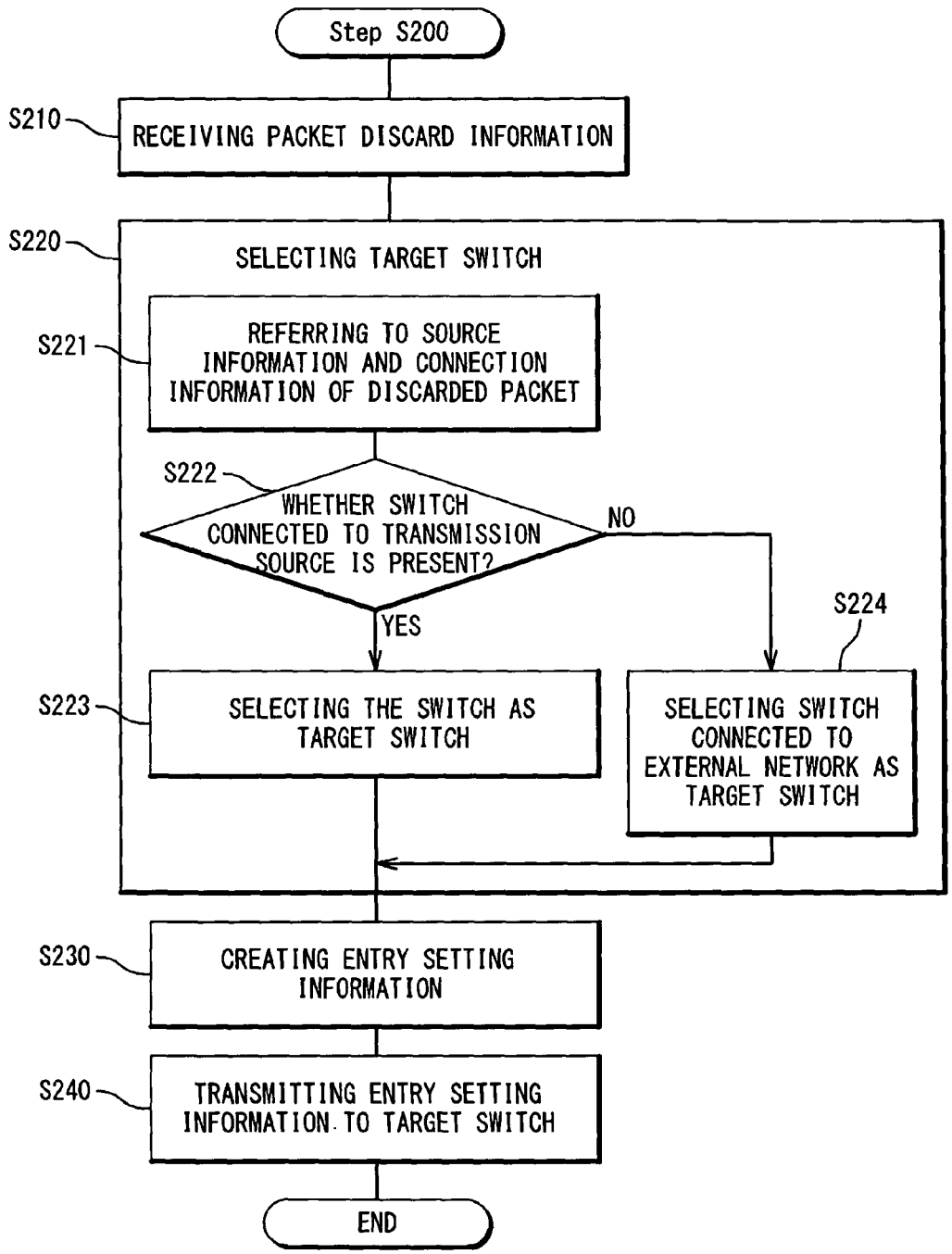
FIG. 9 is a flowchart showing the step S200 in the present exemplary embodiment.

FIG. 9 is a flowchart more specifically showing step S200 performed by the controller 200 (see FIG. 3).

Step S210:

The appliance communication section 210 of the processor 201 receives (obtains) the packet discard information DRP from the appliance 100 through the communication device 203. The appliance communication section 210 stores the packet discard information DRP into the storage device 202. In response to this packet discard information DRP, the processor 201 performs the "switch control process (steps S220 to S240)" as follows.

Step S220:

The switch selection section 220 of the processor 201 selects a target switch 300 from the network. At this point, the switch selection section 220 selects as the target switch 300 the switch 300 located as close to the transmission source 50 of the discarded packet as possible. To this end, the switch selection section 220 selects the target switch 300 in a method described below.

First, the switch selection section 220 reads the packet discard information DRP and the connection information CON (see FIG. 5) from the storage device 202. The packet discard information DRP includes information related to the transmission source 50 of the discarded packet (hereinafter referred to as "source information"). As the source information, a source IP address is exemplified. The switch selection section 220 refers to this source information and the connection information CON (step S221). As a result of this, the switch selection section 220 checks whether or not the switches 300 connected to the transmission source 50 are present in the network (step S222).

If a switch 300 connected to the transmission source 50 is present in the network (Yes in step S222), the switch selection section 220 selects this switch 300 as the target switch 300 (step S223). On the other hand, if a switch 300 connected to the transmission source 50 is not present in the network (No in step S222), this means that the transmission source 50 is present in the external network. Therefore, the switch selection section 220 selects as the target switch 300 the switch 300 connected to the external network (step S224). With such method, the switch selection section 220 can select as the target switch 300 the switch 300 which is closest to the transmission source 50.

Referring to FIG. 4, an example of selecting the target switch will be described. As one example, it is assumed that the case where a client 20 (transmission source) of the external network transmits a packet destined to the server 10-1 in the network system 1 according to the present exemplary embodiment. It is assumed that this packet is transferred from the external network to the appliance 100-1 via the switches 300-4 and 300-1 and then discarded in the appliance 100-1. Referring to FIG. 5, no switch 300 connected to the client 20 serving as the transmission source is found (No in step S222). Therefore, the switch 300-4 connected to the external network is selected as the target switch (step S224). That is, the switch 300-4 closest to the transmission source in the network system 1 is selected as the target switch.

As another example, it is assumed that the case where the server 10-3 (transmission source) in the network system 1 according to the present exemplary embodiment transmits a packet toward the external network. It is assumed that this packet is transferred from the server 10-3 to the appliance 100-1 via the switches 300-2 and 300-1 and then discarded in this appliance 100-1. Here, it is assumed that the server 10-3 is infected with virus and transmits attack traffic. Referring to FIG. 5, it can be found that the switch 300-2 is connected to the server 10-3 serving as the transmission source (Yes in step S222). Therefore, this switch 300-2 is selected as the target switch (step S223). That is, the switch 300-2 closest to the transmission source in the network system 1 is selected as the target switch.

As described above, the switch selection section 220, regardless of whether the transmission source 50 is located in the internal network or the external network, selects as the target switch 300 the switch 300 closest to this transmission source 50. This means that an unnecessary traffic is stopped at a position as close to the transmission source 50 as possible, and leads to efficient use of the network band width.

Step S230:

The information conversion section 230 of the processor 201 reads the packet discard information DRP from the storage device 202. Then the information conversion section 230, based on this packet discard information DRP, creates the entry setting information ENT. The created entry setting information ENT instructs the target switch 300 to create an entry such that a packet belonging to the same flow as the discarded packet in the appliance 100 is discarded. That is, the information conversion section 230 converts the packet discard information DRP into the entry setting information ENT corresponding thereto. The information conversion section 230 stores the created entry setting information ENT into the storage device 202.

FIG. 10 shows one example of the conversion from the packet discard information DRP into the entry setting information ENT. Here, the appliance 100 which has discarded the packet is a firewall. A source IP address (src IP: X. X. X. X), a destination IP address (dst IP: Y. Y. Y. Y), a source port number (src port: 1234), and a destination port number (dst port: 5678) can be found from the packet discard information DRP. Moreover, the controller 200 knows that the switch 300 is set on an IP network, and thus sets Ethernet type as 0x800 (IPv4). A source MAC address, a destination MAC address, and VLAN ID are not described in the packet discard information DRP and thus set at "Any (*)". The input port (input switch port) is a port number of the aforementioned target switch 300 connected to the external network or the transmission source, and is obtained in step S220 described above. The action is set as "drop" which means packet discard.

FIG. 11 shows another example of the conversion from the packet discard information DRP into the entry setting information ENT. Here, the appliance 100 which has discarded the packet is an intrusion prevention system (IPS) that inspects a multilayer including layers up to an application layer. It can be found that the conversion process is possible, as is the case with FIG. 10. It should be noted that the present exemplary embodiment can support not only the appliance 100, such as a firewall, that inspects L4 but also the appliance 100, such as the intrusion prevention system, that inspects the multilayer including the layers up to L7.

Step S240:

The network control section 240 reads from the storage device 202 the entry setting information ENT created in step S230. Then the network control section 240 passes over the entry setting information ENT to the switch communication section 250, and gives instructions for transmitting this entry setting information ENT to the target switch 300 selected in step S220. The switch communication section 250 transmits the entry setting information ENT to the target switch 300 through the communication device 203.

FIG. 12 is a flowchart more specifically showing step S300 performed by the target switch 300.

Step S310:

The target switch 300 receives the entry setting information ENT from the controller 200.

Step S320:

The target switch 300 sets the entry in its own flow table TBL in accordance with this entry setting information ENT. Specifically, the target switch 300 creates the entry such that a packet belonging to the same flow as the discarded packet in the appliance 100 is discarded (see FIGS. 10 and 11).

Then, a subsequent packet belonging to this flow is discarded by the target switch 300 without being transferred to the appliance 100.

3-3. Modified Examples

Figure 13:
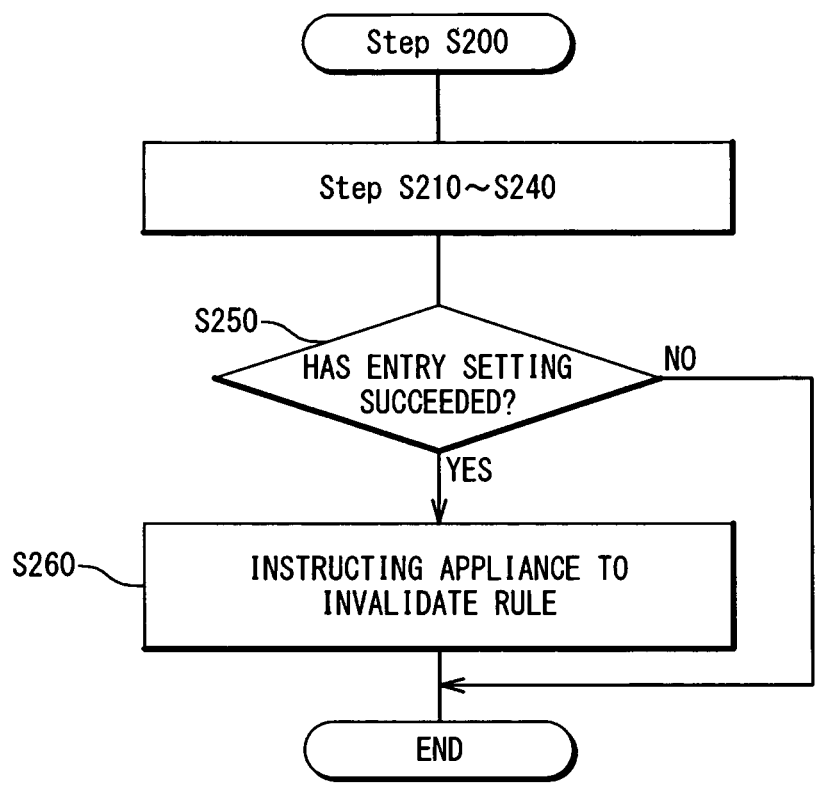
FIG. 13 is a flowchart showing a modified example of the process according to the present exemplary embodiment.
Figure 14:
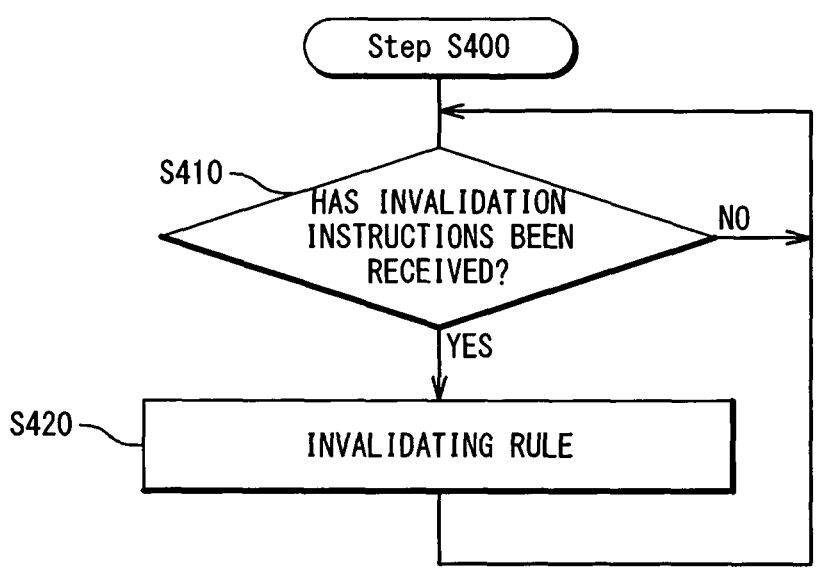
FIG. 14 is a flowchart showing a modified example of the process according to the present exemplary embodiment.

FIGS. 13 and 14 show modified examples of the process according to the present exemplary embodiment. In the modified examples, after the switch control process (steps S220 to 240) described above, a process below is further executed.

If the entry setting in the target switch 300 (step S300) has succeeded (Yes in step S250), the network control section 240 of the processor 201 carries out step S260. In step S260, the network control section 240 instructs the appliance 100, which has discarded the packet, to invalidate a rule related to the flow to which the discarded packet belongs. The rule invalidation instructions are transmitted to the relevant appliance 100 via the appliance communication section 210 and the communication device 203.

The appliance 100 receives the rule invalidation instructions from the controller 200 (Yes in step S410). Based on the rule invalidation instructions, the appliance 100 invalidates the relevant rule (step S420). Here, invalidating the relevant rule means that this rule is excluded from a target to which reference is made in the appliance process. As a result, load imposed upon the appliance process performed by the appliance 100 is then reduced.

4. Effect

As described above, according to the present exemplary embodiment, when a packet belonging to a given flow has been discarded by the appliance 100, a subsequent packet belonging to the same flow is discarded by the target switch 300 without being transferred to the appliance 100. As a result, traffic of the flow to be discarded is no longer continuously supplied to the appliance 100. Therefore, waste of the appliance resources and the network band width is prevented. The appliance resources and the network band width can efficiently be used.

Moreover, according to the present exemplary embodiment, regardless of whether the transmission source 50 of the discarded packet is in the internal network or the external network, the switch 300 closest to this transmission source 50 is selected as the target switch 300. This makes it possible to stop an unnecessary traffic at a position as close to this transmission source 50 as possible. As a result, the network band width can even more efficiently be used.

Patent Literatures 1 and 2 described above assume only attack traffic from the outside. In this case, providing at one section a device such as a Mitigator like an IPS could exclude the unnecessary traffic. However, for Cloud environment, attacking from an internal machine also needs to be considered. Considering efficient use of the network in the data center, it is desirable that the unnecessary traffic be excluded near the transmission source. However, it cannot easily be recognized on a switch level to which host the connection is made. In the present exemplary embodiment, as described above, regardless of whether the transmission source is in the internal network or the external network, the unnecessary traffic can be excluded at the position closest to this transmission source.

Furthermore, as shown in FIGS. 10 and 11, the present exemplary embodiment can support not only the appliance 100, such as a firewall, that inspects the L4 but also the appliance 100, such as the intrusion prevention system, that inspects the multilayer including the layers up to L7. In some cases, the appliance 100 cannot recognize attacking by inspecting the layers L4 and below but can recognize the attacking by inspecting those up to the applicant layers up to L7. Thus, it is important to perform the inspection not limited to L4 but with the multilayer including the layers up to L7.

Moreover, in the present exemplary embodiment, when the appliance 100 has discarded a packet, the appliance 100 creates the packet discard information DRP and transmits this packet discard information DRP to the controller 200. Such process can be realized by the "syslog" typically adopted in many appliances. That is, there is no need of altering an existing appliance to realize the process according to the present exemplary embodiment. It is also possible to support a multivendor.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-000252 filed on Jan. 4, 2010, the disclosure of which is incorporated herein in its entirety by reference.

The invention claimed is:

1. A network system comprising:
an appliance and a switch configured to be arranged in a network; and
a controller configured to be connected to the appliance and the switch,
wherein the switch includes a flow table,
wherein each entry of the flow table indicates a match condition and an action to be performed on a packet which matches the match condition,
wherein the switch sets an entry in the flow table in response to entry setting information transmitted from the controller,
wherein the switch, upon receiving a reception packet, refers to the flow table and carries out an action specified by an entry which matches the reception packet on the reception packet,
wherein the appliance has a packet discard function, and when the packet is discarded, transmits packet discard information as information related to the discarded packet to the controller,
wherein the controller performs a switch control process in response to the packet discard information, and
wherein in the switch control process, the controller selects a target switch from the network, creates entry setting information for instructing the target switch to create an entry such that a packet belonging to the same flow as the discarded packet is discarded, and transmits the created entry setting information to the target switch.

2. The network system according to claim 1, wherein said controller includes:
- a storage device configured to store connection information indicating connection relationship of the network,
- wherein said packet discard information includes information related to a transmission source of the discarded packet, and
- wherein said controller selects as the target switch a switch which is closest to the transmission source with reference to said packet discard information and said connection information.

3. The network system according to claim 2, wherein if a switch connected to the transmission source is present in the network, the controller selects the switch as the target switch, and
- wherein if the switch connected to the transmission source is not present in the network, the controller selects as the target switch a switch connected to the external network.

4. The network system according to claim 1, wherein after the switch control process, the controller instructs the appliance to invalidate a rule related to a flow to which the discarded packet belongs.

5. A controller connected to an appliance and a switch arranged in a network, wherein the switch includes a flow table,
- wherein each entry of the flow table indicates a match condition and an action to be performed on a packet which matches the match condition,
- wherein the switch sets an entry in the flow table in response to entry setting information transmitted from the controller,
- wherein the switch, upon receiving a reception packet, refers to the flow table and carries out an action specified by an entry which matches the reception packet on the reception packet, and
- wherein the appliance has a packet discard function, and when the packet is discarded, transmits packet discard information as information related to the discarded packet to the controller, said controller comprising:
- a storage device configured to store the packet discard information; and
- a processor configured to perform a switch control process in response to the packet discard information,
- wherein in the switch control process, the processor selects a target switch from the network, creates entry setting information for instructing the target switch to create an entry such that a packet belonging to the same flow as the discarded packet is discarded, and transmits the created entry setting information to the target switch.

6. The controller according to claim 5, wherein said storage device further stores connection information indicating connection relationship of the network,
- wherein said packet discard information includes information related to a transmission source of the discarded packet, and
- wherein said processor selects as the target switch a switch which is closest to the transmission source with reference to said packet discard information and said connection information.

7. A control method for a network including an appliance and a switch arranged therein, wherein the switch includes a flow table,
- wherein each entry of the flow table indicates a match condition and an action to be performed on a packet which matches the matching condition,
- wherein the switch sets an entry in the flow table in response to entry setting information, and
- wherein the switch, upon receiving a reception packet, refers to the flow table and carries out an action specified by an entry which matches the reception packet on the reception packet, said control method comprising:
- when a packet is discarded in the appliance, obtaining packet discard information as information related to the discarded packet; and
- performing a switch control process in response to the packet discard information,
- wherein the switch control process includes:
- selecting a target switch from the network,
- creating entry setting information for instructing the target switch to create an entry such that a packet belonging to the same flow as the discarded packet is discarded; and
- transmitting the created entry setting information to the target switch.

8. A non-transitory recording medium in which a control program for making a computer execute a control process of a network including an appliance and a switch arranged therein, wherein the switch includes a flow table,
- wherein each entry of the flow table indicates a match condition and an action to be performed on a packet which matches the matching condition,
- wherein the switch sets an entry in the flow table in response to entry setting information,
- wherein the switch, upon receiving a reception packet, refers to the flow table and carries out an action specified by an entry which matches the reception packet on the reception packet, said control process comprising:
- when a packet is discarded in the appliance, obtaining packet discard information as information related to the discarded packet; and
- performing a switch control process in response to the packet discard information,
- wherein the switch control process includes:
- selecting a target switch from the network, and
- creating entry setting information for instructing the target switch to create an entry such that a packet belonging to the same flow as the discarded packet is discarded, and
- transmitting the created entry setting information to the target switch.

* * * * *